R. W. DULL.
LINK FOR CHAIN BELTS.
APPLICATION FILED MAR. 22, 1920.

1,403,674.

Patented Jan. 17, 1922.

Witness.
Edward T. Wray.

Inventor.
Raymond W. Dull.
by Parker & Carter
Attorneys

UNITED STATES PATENT OFFICE.

RAYMOND W. DULL, OF LA GRANGE, ILLINOIS, ASSIGNOR TO LINK BELT COMPANY, OF CHICAGO, ILLINOIS, A CORPORATION OF ILLINOIS.

LINK FOR CHAIN BELTS.

1,403,674.  Specification of Letters Patent.  Patented Jan. 17, 1922.

Application filed March 22, 1920. Serial No. 367,652.

*To all whom it may concern:*

Be it known that I, RAYMOND W. DULL, a citizen of the United States, residing at La Grange, in the county of Cook and State of Illinois, have invented a certain new and useful Improvement in Links for Chain Belts, of which the following is a specification.

My invention relates to integral links for chain belts formed from sheet metal of substantially uniform thickness.

Some of the objects of my invention are to provide a wide supporting base for the hook; substantially tubular, closely fitting, interlocking pintle and hook ends; and to form such pintle and hook ends so that the edges of their parts will be on the upper side of the link.

Other objects and advantages not herein necessary to be mentioned will be found to be characteristic of my invention.

It will be understood that I do not wish to be limited to the particular proportions of parts here shown as they may be greatly varied without departing from the spirit of my invention. The hook end is shown in the preferred form but it can be made in any one of a variety of ways.

The invention is illustrated in the accompanying drawings wherein.

Like parts are indicated by the same letter in all the figures.

Figure 1:
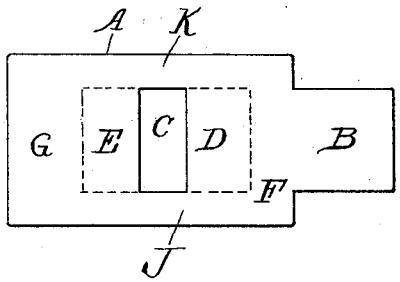
Figure 1 is a view of a blank from which such link may be formed.
Figure 2:
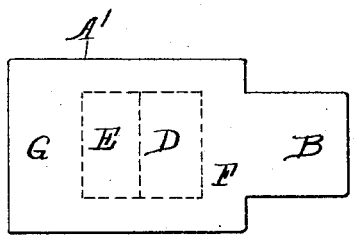
Figure 2 is a view of a modified blank.
Figure 3:
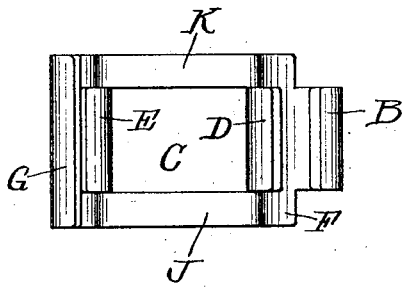
Figure 3 is a plan view of a finished link.
Figure 4:
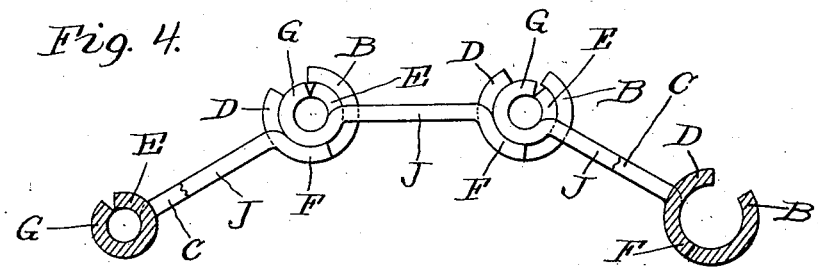
Figure 4 is a side view of a flexed chain composed of such links.

A is a blank having the hook portion B, a hole C, at opposite ends of the hole C, parts D and E to form respectively the inner portions of the hook and pintle ends, and end bars F and G connected by the side bars J and K. A¹ is a similar blank from which, however, the hole has been omitted and from which a shorter link will therefore be produced. The end bars F and G are downwardly bent opposite the lines of attachment of the parts D and E and the end bar G and hook portion B are upwardly and inwardly bent as indicated. The two inner portions E and D are upwardly and outwardly bent so as to bring their edges in opposition respectively to the edges of the parts B and G. The edges of the pintle portions are preferably brought substantially into engagement and the edges of the hook portions are preferably brought to lines where the distance between them is approximately equal to the thickness of the sheet metal. The line of union between the end bar F and the hook portion B lies approximately in the lowest line of curvature of the hook end and thus, when the chain is flexed, the line of stress is brought closely to this line of union between the hook and the end bar which thus forms its broad supporting base.

The opposed edges of the two ends are approximately in the upper plane of the link and their meeting edges are thus so situated as to minimize the tendency of the edges of the pintle end to wear the bearing surface of the hook end.

The interior diameter of the tubular hook end is approximately equal to the exterior diameter of the tubular pintle end so that when interlocked, they form a close fit to make it possible to practically lubricate them.

The two working faces of the pintle and hook respectively are relatively smooth and substantially unbroken.

A chain composed of such links is self-cleaning as all the parts are substantially open upwardly and outwardly.

If a link of relatively short length is desired, the hole can be suppressed, the blank shortened and thus a saving of material be effected.

It will of course be observed that some of the features of my invention can be obtained without using the others.

It will be understood of course that the size and proportions of the several parts could be greatly varied without departing from the spirit of my invention and I do not wish therefore to be limited to the precise relations shown in the drawings.

Figure 5:
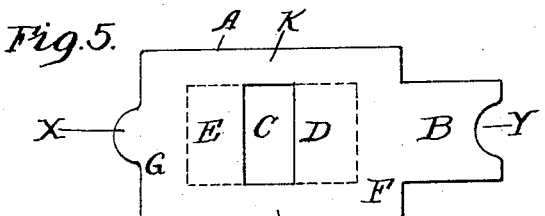
Figure 5 is a modified form of blank.

The modified form of blank shown in Fig. 5 is made with the notch *y* and the tongue *x*. By means of this construction I am able to save material of a length equal to the length of the tongue, in manufacture of each link.

Claims:

1. An integral single thickness sheet metal chain link comprising two side and two end bars and two substantially tubular ends, the pintle end having an external diameter approximately the same as the internal diameter of the hook end, both ends projecting above and below the body, the hook end consisting of an end bar and two portions bent upwardly and respectively inwardly and outwardly toward each other from the opposite sides of such end bar, and the other end consisting of an end bar bent downwardly and upwardly and inwardly and another portion bent upwardly and outwardly toward such end bar.

2. An integral single thickness sheet metal chain link comprising two side and two end bars and two substantially tubular ends, the pintle end having an external diameter approximately the same as the internal diameter of the hook end, both ends projecting above and below the body, the hook end consisting of an end bar and two portions bent upwardly and respectively inwardly and outwardly toward each other from the opposite sides of such end bar, and the other end consisting of an end bar bent downwardly and upwardly and inwardly and another portion bent upwardly and outwardly toward such end bar, the edges of the pintle forming portions brought into approximate engagement with each other.

3. An integral single thickness sheet metal chain link comprising two side and two end bars and two substantially tubular ends, the pintle end having an external diameter approximately the same as the internal diameter of the hook end, both ends projecting above and below the body, the hook end consisting of an end bar and two portions bent upwardly and respectively inwardly and outwardly toward each other from the opposite sides of such end bar, and the other end consisting of an end bar bent downwardly and upwardly and inwardly and another portion bent upwardly and outwardly toward such end bar, the line of departure of the hook portion from the cross bar being approximately at the lowest line of curvature of the hook end.

4. An integral single thickness sheet metal chain link comprising two side and two end bars and two substantially tubular ends, the pintle end having an external diameter approximately the same as the internal diameter of the hook end, both ends projecting above and below the body, the hook end consisting of an end bar and two portions bent upwardly and respectively inwardly and outwardly toward each other from the opposite sides of such end bar, and the other end consisting of an end bar bent downwardly and upwardly and inwardly and another portion bent upwardly and outwardly toward such end bar, the two upwardly and outwardly bent portions having a combined length approximately equal to the distance between their bases.

5. An integral single thickness sheet metal chain link having at one end a substantially tubular hook and at the other end a substantially tubular pintle, said hook and pintle members being each formed of sheet metal portions extending upwardly above the link body.

6. An integral single thickness sheet metal chain link having at one end a substantially tubular hook and at the other end a substantially tubular pintle, said hook and pintle members being each formed of sheet metal portions extending upwardly above the link body, said portions of the pintle member adapted to form a substantially closed tube, the opposed ends meeting, on the upper side of the link, the portions forming the hook terminating adjacent each other on the upper side of the link, being separated by a space substantially equal to the thickness of the sheet metal.

In testimony whereof, I affix my signature in the presence of two witnesses this 16th day of March, 1920.

RAYMOND W. DULL.

Witnesses:
MILDRED H. MACKE,
EDNA B. PETERSON.